United States Patent [19]

Uzkan

[11] Patent Number: 5,598,705
[45] Date of Patent: Feb. 4, 1997

[54] TURBOCHARGED ENGINE COOLING APPARATUS

[75] Inventor: Teoman Uzkan, Indian Head Park, Ill.

[73] Assignee: General Motors Corporation, Detroit, Mich.

[21] Appl. No.: 437,391

[22] Filed: May 12, 1995

[51] Int. Cl.⁶ ................................................ F02B 29/04
[52] U.S. Cl. ................................................................ 60/599
[58] Field of Search ........................... 60/599; 123/41.29, 123/41.31, 563

[56] References Cited

U.S. PATENT DOCUMENTS

| | | | |
|---|---|---|---|
| 3,397,684 | 8/1968 | Scherenberg | 60/599 |
| 4,061,187 | 12/1977 | Rajasekaran et al. | 60/599 |
| 4,325,219 | 4/1982 | Stang et al. | 60/599 |
| 4,961,404 | 10/1990 | Itakura et al. | 123/563 |
| 5,353,757 | 10/1994 | Susa et al. | 123/41.29 |
| 5,392,741 | 2/1995 | Uzkan | 123/41.13 |

FOREIGN PATENT DOCUMENTS 950020  2/1964  United Kingdom ................... 123/563

*Primary Examiner*—Michael Koczo
*Attorney, Agent, or Firm*—Robert M. Sigler

[57] ABSTRACT

An internal combustion engine, such as a diesel engine for a diesel electric locomotive, is provided with a turbocharger having an aftercooler. A cooling apparatus for the engine is provided with a main coolant loop having a pump and a radiator and an aftercooler coolant loop having a pump and a radiator. The coolant temperature in the aftercooler coolant loop is maintained lower than the coolant temperature in the main coolant loop when the coolant flows of the main and aftercooler coolant loops are maintained separate. Linking conduits are provided from a point in the aftercooler coolant loop to a point of lower pressure in the main coolant loop and from a point in the main coolant loop to a point of lower pressure in the aftercooler coolant loop; and valve apparatus in at least one of the linking conduits is activatable by a control in response to an engine operation related parameter between a first condition preventing coolant flow therethrough so as to maintain coolant flows in the main and aftercooler coolant loops separate and a second condition allowing coolant flow therethrough so as to allow mixing of coolant between the main and aftercooler coolant loops. Activation of the valve apparatus thus provides a shift in the cooling capacity of the cooling apparatus between the main and aftercooler coolant loops.

4 Claims, 3 Drawing Sheets

TURBOCHARGED ENGINE COOLING APPARATUS

BACKGROUND OF THE INVENTION

The field of this invention is cooling apparatus for a turbocharged internal combustion engine that includes a turbocharger aftercooler. In a specific embodiment, this invention is especially useful for use in a diesel electric locomotive.

Diesel electric locomotives, used to move railway cars, are propelled by exerting torque to drive wheels that are in contact with rails. The power to propel the locomotive is developed first by a high powered diesel engine; and the diesel engine drives a generator that converts mechanical energy to electrical energy. The electrical energy is applied to electric traction motors, which convert the electrical energy back to mechanical energy applied to the wheels for propulsion along the rails.

As with all internal combustion engines, a diesel engine of a locomotive must be cooled in operation to remove heat developed in the combustion process so as to limit engine operating temperature. Although some heat may be removed by circulating lubricating oil, the major cooling is done by a primary engine cooling system using a circulating liquid coolant to carry excess engine heat from the engine to a heat exchanging apparatus such as a radiator for transfer to the environment. FIG. 1 shows, in block diagram, a prior art cooling system 10 used in a locomotive diesel engine 20. Coolant is circulated by a pump through a coolant conduit 24 from engine 20, from which it receives heat, to radiators 26, from which heat is released to the ambient air of the environment, which is drawn through radiators 26 by fans 28 and/or 30. The coolant is circulated by a coolant pump 38 through a coolant loop comprising coolant pump 38, coolant passages in engine 20, radiators 26, and optional oil cooler 34. Coolant tank 42 may be provided communicating with conduit 24 near the inlet of coolant pump 38 to give and receive coolant as required to maintain coolant in the loop.

In addition, the power of the engine can be increased by burning more fuel in the cylinder. To burn an increased amount of fuel, more air must be provided in the cylinder. In many modern internal combustion engines, including most used in diesel electric locomotives, this air is provided by a turbocharger 48, which compresses the ambient air to a higher pressure and therefore density. However, this compression also increases the temperature of the air, which is not desirable, since it reduces the volumetric efficiency of engine 20. In addition, a lower inlet air temperature can reduce undesirable emissions from engine 20. It is thus desirable to cool the air provided from turbocharger 48 to the cylinders of engine 20; and an aftercooler 22 is used to transfer heat from the air exiting turbocharger 48 to the coolant in coolant loop 10. Aftercooler 22 is placed in loop 24 in parallel with engine 20 so that the heat transferred to the coolant in aftercooler 22 is also radiated to the ambient air of the environment in radiators 26. The cooling of engine inlet air by aftercooler 22 thus improves engine efficiency and reduces engine emissions, as is also well known in the art.

The highest priority of an engine cooling system is the protection of engine components from temperatures beyond their safe operating limits. Thus, the system must be designed to provide a cooling capacity for the engine sufficient for the worst case expected: that is, the highest allowed engine power levels at the highest expected ambient air temperatures. Among the several parameters which affect the cooling capacity of the engine cooling system is the temperature difference between the coolant and the air entering radiators 26. The greater this difference, the greater will be the heat transfer from the coolant to the ambient air. Thus, the cooling systems of the prior art, as typified by system 10 of FIG. 1, are designed to maintain coolant temperature at or below a maximum temperature sufficiently low to protect the engine under the worst case conditions. When a cooling system is designed for a given maximum ambient temperature and maximum engine power level, the cooling capacity at radiators 26 will be more than required to cool the engine at lower ambient air temperature or at lower engine power operation; however, the unused cooling capacity of the main loop cannot be easily, if at all, applied to other cooling tasks, such as aftercooler 22, in an optimal manner.

SUMMARY OF THE INVENTION

It is an object of this invention to provide control over the relative apportionment of cooling capacity in a cooling apparatus for a turbocharger equipped internal combustion engine between the engine itself and a turbocharger aftercooler so as to permit optimal use of the cooling capacity of the cooling system in different engine operating conditions.

The engine of this invention is provided with cooling apparatus comprising a main coolant loop for the engine itself and an aftercooler coolant loop for the aftercooler. The main coolant loop comprises a main pump, a main radiator and a main coolant conduit connecting the main pump, the coolant passages of the engine and the main radiator for unidirectional circulation of a liquid coolant. The aftercooler coolant loop comprises an aftercooler pump, an aftercooler radiator and an aftercooler coolant conduit connecting the aftercooler pump, the aftercooler and the aftercooler radiator for unidirectional circulation of a liquid coolant. The main and aftercooler loops are capable of separate and independent operation; and the components of the aftercooler coolant loop provide a lower aftercooler coolant temperature than the main coolant temperature provided by the components of the main coolant loop therein when coolant flows of the main and aftercooler coolant loops are maintained separate.

A first linking conduit is provided from a point in the aftercooler coolant loop to a point of lower pressure in the main coolant loop; and a second linking conduit is provided from a point in the main coolant loop to a point of lower pressure in the aftercooler coolant loop. Valve apparatus in at least one of the first and second linking loops has a first condition preventing coolant flow therethrough so as to maintain separate coolant flows in the main and aftercooler coolant loops and a second condition allowing coolant flow therethrough so as to permit mixing of coolant between the main and aftercooler coolant loops. A control responsive to an engine operation related parameter activates the valve apparatus between its first and second conditions.

The difference between the lower aftercooler coolant temperature and the higher main coolant temperature is maximized when the linking valve is closed to keep the main and aftercooler coolant flows separate; but mixing of the coolant between the main and aftercooler coolant loops when the linking valve is opened reduces the difference between the aftercooler coolant temperature and main coolant temperature, with the former increasing and the latter decreasing. Thus, activation of the linking valve provides a shift in a portion of the cooling capacity of the cooling apparatus between the main and aftercooler cooling loops.

Further details and advantages of this invention will be apparent from the accompanying drawings and following description of specific embodiments.

DESCRIPTION OF THE PREFERRED EMBODIMENTS

Figure 2:
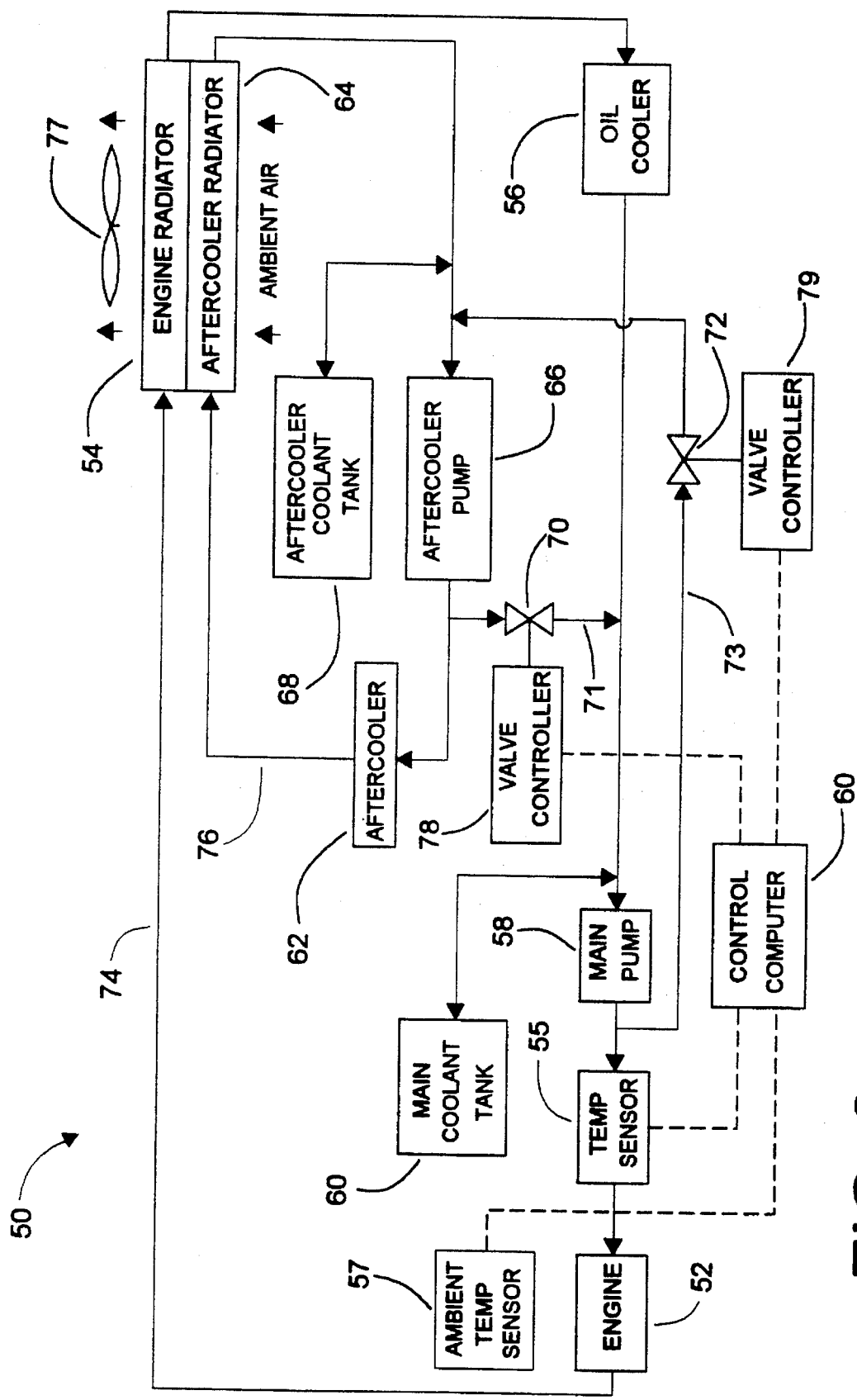
FIGS. 2 and 3 show embodiments of an engine cooling system according to the invention in block diagram form.

Referring to FIG. 2, a cooling apparatus 50 is shown for an internal combustion engine 52, such as a diesel engine for a locomotive. Engine 52 is provided with a turbocharger equipped with an aftercooler 62, which provides pressurized, cooled inlet air to engine 52. Cooling apparatus 50 comprises two separate coolant loops: a main coolant loop for engine 52 and an aftercooler coolant loop for turbocharger aftercooler 62.

The main coolant loop comprises a main coolant conduit 74, a main pump 58, the coolant passages of engine 52, an engine radiator 54 and an optional oil cooler 56. In the main coolant loop, coolant is circulated unidirectionally around the loop by pump 58 so that it receives heat from oil cooler 56 and engine 52 and gives up heat to the ambient air of the environment in engine radiator 54. Main coolant tank 60 communicates with the main loop near the inlet of main pump 58 to give and receive coolant therefrom as required to maintain coolant in the loop.

Figure 1:
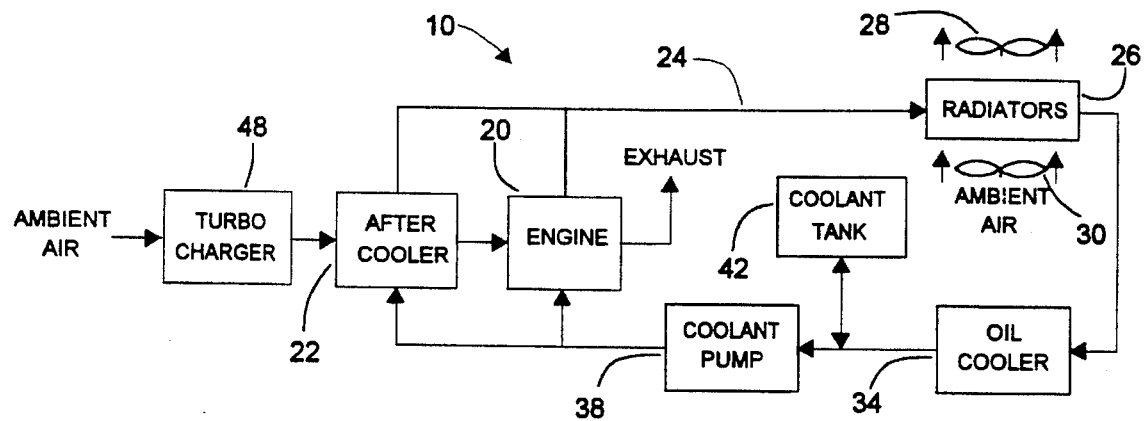
FIG. 1 shows in block diagram, an engine with a cooling system as known in the prior art.

The aftercooler coolant loop comprises an aftercooler coolant conduit 76, a coolant pump 66, an aftercooler 62, and an aftercooler radiator 64. In the aftercooler coolant loop, coolant is circulated unidirectionally around the loop by pump 66 so that it picks up heat from aftercooler 62 and gives up heat to the ambient air of the environment in aftercooler radiator 64. Aftercooler coolant tank 68 connects to the aftercooler coolant loop near the inlet of aftercooler pump 66 to give and receive coolant therefrom as required to maintain coolant in the loop. Fans 77 force ambient air through main radiator 54 and aftercooler radiator 64. Each of the components operates in the same manner as those described in the prior art system described in FIG. 1, except that the main and aftercooler coolant loops are each complete and capable of separate and independent operation. The components of the main and aftercooler coolant loops are sized and designed so that, with separate operation and no mixing of coolant between the loops, the aftercooler coolant loop maintains a lower coolant temperature than the main coolant loop. This can be accomplished, for example, through the design of the radiators 54 and 64: their relative sizes, locations, order of air flow therethrough, use of air flow controlling shutters, etc.

Additionally, a pair of valved linking conduits are provided for optionally mixing coolant between the main and aftercooler coolant loops. Linking conduit 71, including a linking valve 70, communicates the aftercooler coolant loop on the high pressure side of aftercooler pump 66 with the main coolant loop on the low pressure side of main pump 58. With linking valve 70 open, part of the cooler coolant at the output of aftercooler pump 66 is diverted through valve 70 into the main coolant loop to mix with the hotter coolant therein, wherein it absorbs heat and thus decreases the coolant temperature of the main coolant loop. Similarly, a linking conduit 73, including a linking valve 72, communicates the main coolant loop on the high pressure side of main pump 58 with the aftercooler coolant loop on the low pressure side of aftercooler pump 66. With linking valve 72 open, part of the hotter output of main pump 58 is diverted through linking valve 72 into the aftercooler coolant loop to mix with the cooler coolant therein, wherein it gives up heat and thus increases the coolant temperature of the aftercooler coolant loop. Thus, with linking valves 70 and 72 open and coolant from the two loops mixed, heat is transferred from the hotter main coolant loop to the cooler aftercooler coolant loop so as to decrease the difference in coolant temperature therebetween. The more linking valves 70 and 72 are opened, the more coolant will be mixed between the main and aftercooler coolant loops and the smaller will be the difference in coolant temperature therebetween. Thus, the opening of valves 70 and 72 effectively transfers additional cooling capacity to the main loop from the aftercooler loop.

The opening and closing of linking valves 70 and 72 are controlled by valve controllers 78 and 79, respectively; and controllers 78 and 79 are under the command of a control computer 60. Computer 60 may be a standard digital or analog computer which receives signals from engine and/or ambient parameter sensors. A simple illustrative example of a control strategy is the use of a coolant temperature sensor 55 in the main coolant loop, as seen in FIG. 2 between main pump 58 and engine 52. Since an increasing coolant temperature in the main coolant loop provides an indication that additional cooling capacity may be needed for engine 52, control computer 60 maintains linking valves 70 and 72 closed below a predetermined valve activating main coolant temperature and opens the valves above this temperature. Linking valves 70 and 72 may have only a single full open position or may have a plurality of degrees of opening. In either case, the amount of opening may be modulated as is well known in the art, in the former, for example, by pulse width control and in the latter, for example, by position control. The location shown herein for sensor 55 is not critical; the sensor could be located elsewhere in the main coolant loop.

Figure 4:
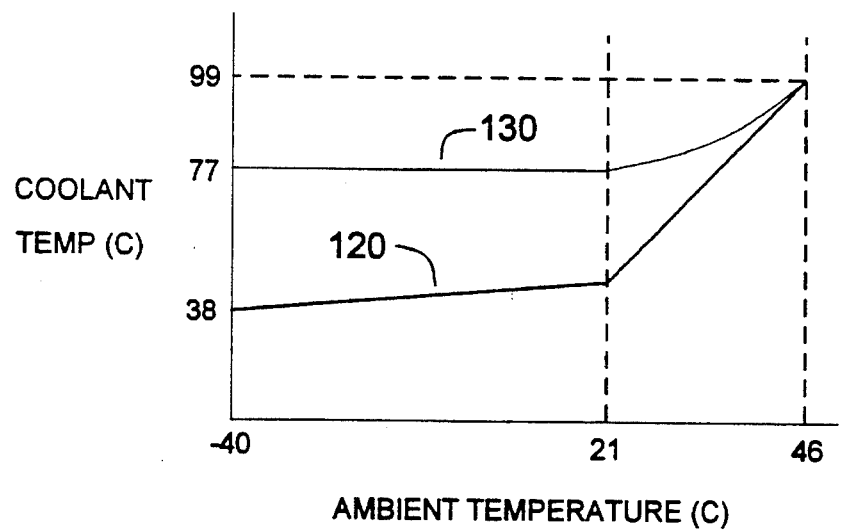
FIG. 4 shows a graphical representation of a desired coolant/ambient air temperature relationship illustrating one method of utilizing the invention.

Another control strategy is based on the sensing of ambient air temperature, such as by an ambient air temperature sensor 57, which may be located in a convenient and representative location adjacent engine 52 and provides an ambient air temperature signal to computer 60. This control strategy will be described with reference to the graph of FIG. 4. The horizontal axis represents the ambient air temperature of the environment in which the engine is operated across an expected range of minus 40 degrees C. to 46 degrees C., with an indication of a moderate ambient air temperature of 21 degrees C. The vertical axis represents coolant temperature and includes a range of somewhat below 38 degrees C. to 99 degrees C. Curve 120 indicates a desired coolant temperature in the aftercooler coolant loop, and curve 130 indicates a desired coolant temperature in the main coolant loop.

In this example, the components of the main coolant loop are designed to maintain the coolant temperature therein at a temperature of 77 degrees C. at or below an ambient air temperature of 21 degrees C. The coolant temperature of the aftercooler loop is allowed to rise from 38 degrees C. to 60 degrees C. over the same range of ambient air temperature. For the maintenance of coolant temperatures in this range, computer 60 may be provided as necessary with coolant temperature sensor inputs and outputs to control the speed of fan 77 and various shutters, not shown but known in the art, to control the air flow through radiators 54 and 64. When the sensed ambient air temperature adjacent engine 52, as indicated by sensor 57, rises above 21 degrees C., linking valves 70 and 72 are opened to transfer additional cooling capacity from the aftercooler coolant loop to the main coolant loop. As ambient air temperature increases further, the valve is opened by an increasing amount. The greater the opening of linking valves 70 and 72, the more coolant will be mixed between the coolant loops, the smaller will be the difference in coolant temperatures therebetween, and the greater will be the transfer of cooling capacity from the aftercooler coolant loop to the main coolant loop. When the ambient air temperature reaches the maximum expected value of 46 degrees C., linking valves 70 and 72 are opened to their greatest extent. At this ambient air temperature, the mixing of coolant between the main and aftercooler loops is substantial; and the coolant temperatures in the loops are practically identical at 99 degrees C. The cooling capacity of the main loop is maximized consistent with the design of its components.

Figure 3:
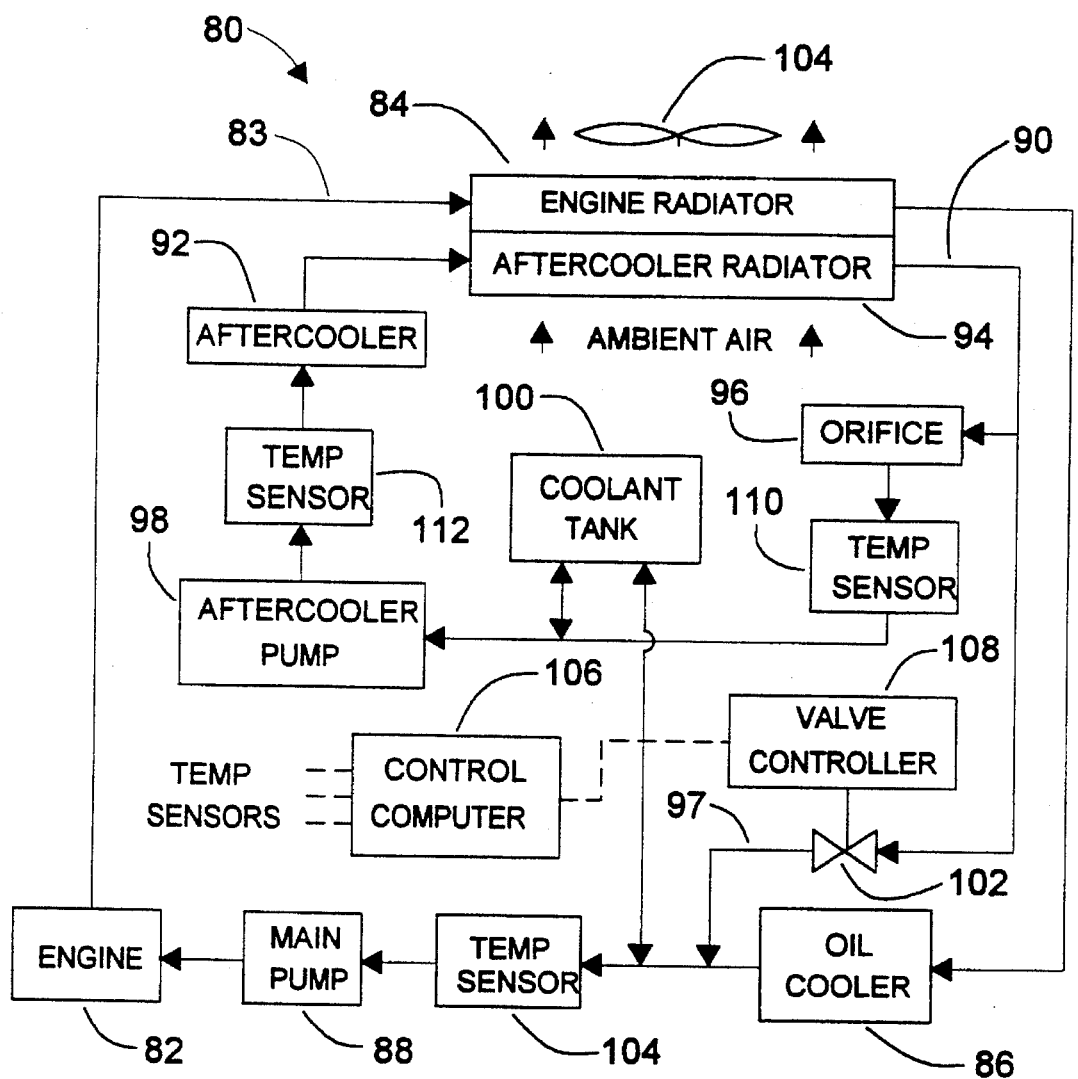

Another embodiment of this invention is shown in FIG. 3. This embodiment comprises a cooling apparatus 80 which uses a single linking valve 102 and valve controller 108 in a linking conduit 97 from an aftercooler coolant conduit 90 in an aftercooler coolant loop to a main coolant conduit 83 in a main coolant loop. A high pressure is created in the aftercooler coolant loop by a restricted orifice therein; and orifice 96 diverts some of the coolant flow from the aftercooler coolant loop to the main coolant loop when linking valve 102 is open. Compensating flow from the main coolant loop to the aftercooler coolant loop is provided through a single coolant tank 100 used by both loops.

In greater detail, the main coolant loop of FIG. 3 comprises a main coolant conduit 83, a main pump 88, the coolant passages of engine 82, an engine radiator 84, an optional oil cooler 86, and an optional coolant temperature sensor 104, which is shown adjacent the inlet of main pump 88 but may be located elsewhere in the main coolant loop. The aftercooler coolant loop comprises an aftercooler coolant conduit 90, an aftercooler pump 98, an optional coolant temperature sensor 112, an aftercooler 92, an aftercooler radiator 94, a restricted orifice 96, and optional coolant temperature sensors 110 and 112. Linking conduit 97 is connected from a point in the aftercooler coolant conduit 90 of increased pressure just before orifice 96 through linking valve 102 to a point of lower pressure in the main coolant conduit 83, such as between oil cooler 86 and main pump 88. When valve 102 is open, some coolant from the aftercooler coolant loop flows through linking conduit 97 to the main coolant loop. A single coolant tank 100 is connected to the main coolant conduit 83 and the aftercooler coolant conduit 90 close to the respective pump inlets; and makeup flow from the main coolant loop to the aftercooler coolant loop occurs therethrough. With valve 102 open, therefore, coolants from the main and aftercooler loops are mixed; and heat is transferred from the hotter main coolant loop to the cooler aftercooler coolant loop. Additional cooling capacity is thus transferred from the aftercooler coolant loop to the main coolant loop as valve 102 is opened.

Linking valve 102 is controlled by a valve controller or actuator 108, which is responsive to a control computer 106. Control computer 106 may be responsive to the coolant temperature sensor 104, which may be located in the main coolant loop near the inlet of main pump 88, to open linking valve 102 when the coolant temperature in the main coolant loop exceeds a predetermined main valve activating temperature, as in the apparatus of FIG. 2.

With the cooling apparatus of this invention maintaining the coolant temperature in the aftercooler coolant loop quite low at low ambient air temperatures, the apparatus is designed to reduce the possibility of aftercooler freezing. Thus, an additional coolant temperature sensor 112 may be located in the aftercooler coolant loop between aftercooler pump 98 and aftercooler 92. Computer 106 is responsive to the indicated coolant temperature signal from sensor 112 to open linking valve 102 when the indicated coolant temperature in the aftercooler coolant loop falls below a predetermined valve activating aftercooler coolant temperature. With linking valve 102 open, coolant from the main and aftercooler coolant loops will mix so as to raise the coolant temperature in the aftercooler coolant loop, and thus in aftercooler 92, to help prevent such freezing.

The control capability provided by the separate main and aftercooler coolant loops with linking conduits and valves may also be used in conjunction with fan and shutter controls for the radiators to provide a smoothly coordinated control. The fan or fans may be controllable only in steps, as in the activation of multiple fans, the restriction of selectable fan speed to specific, stepped values, or the opening or closing of individual shutters. In this case, a continuously adjustable linking valve apparatus may provide a smoothing capability between the steps of the air flow control.

An additional control capability may be provided in the cooling apparatus by estimating the rate of linking coolant flow between the main and aftercooler coolant loops, which may be useful for diagnostic and other purposes. Coolant temperature sensor 110 may be provided in the aftercooler coolant loop between orifice 96 and the communication point in aftercooler conduit 90 with coolant tank 100, before aftercooler pump 98. Since coolant temperature sensor 110 is located just upstream of the entering linking coolant flow and coolant temperature sensor 112 is located just downstream from the entering linking coolant flow, the difference in coolant temperatures registered by these sensors indicates the change in coolant temperature produced by the linking flow, which is related to the linking coolant flow rate. Computer 106 can be programmed with a lookup table storing estimated linking flow rate values as a function of the coolant temperature signals from sensors 110 and 112 or the difference therebetween.

I claim:

1. An internal combustion engine having coolant passages therethrough, a turbocharger for increasing the density of inlet air thereto, an aftercooler for cooling the inlet air from the turbocharger and cooling apparatus comprising:

a main coolant loop comprising a main pump, a main radiator and a main coolant conduit connecting the main pump, the coolant passages of the engine and the main radiator for unidirectional circulation of a liquid coolant;

an aftercooler coolant loop comprising an aftercooler pump, an aftercooler radiator, an aftercooler coolant conduit connecting the aftercooler pump, the aftercooler and the aftercooler radiator for unidirectional circulation of a liquid coolant and a restricted orifice in the aftercooler coolant loop at the inlet of the aftercooler pump, the components of the aftercooler coolant loop providing a lower coolant temperature therein than the coolant temperature provided by the components of the main coolant loop therein when coolant flows of the main and aftercooler coolant loops are maintained separate;

a first linking conduit from the aftercooler loop at the upstream side of the restricted orifice to the inlet of the main pump in the main coolant loop;

a second linking conduit comprising a common coolant tank communicating with the inlets of both the main pump and the aftercooler pump;

valve apparatus comprising a valve in the first linking conduit, the valve having a first condition preventing coolant flow therethrough so as to maintain coolant flows in the main and aftercooler coolant loops separate and a second condition allowing coolant flow therethrough so as to allow mixing of coolant between the main and aftercooler coolant loops; and a control responsive to an engine operation related parameter to activate the valve apparatus between its first and second conditions.

2. The engine of claim 1, wherein the control is responsive to a coolant temperature sensor in the main coolant loop at the inlet to the main pump downstream from the first linking conduit to activate the linking valve to its first condition below a valve activating main coolant temperature and to activate the linking valve to its second condition above the valve activating main coolant temperature.

3. The engine of claim 1, wherein the control is responsive to a first coolant temperature sensor in one of the main and aftercooler loops upstream from the point of entering linking coolant flow and a second coolant temperature sensor in the one of the main and aftercooler loops downstream from the point of entering linking coolant flow to generate an estimated linking coolant flow signal.

4. The engine of claim 3, in which the one of the main and aftercooler loops is the aftercooler loop.

* * * * *